United States Patent
Sanami

(10) Patent No.: US 8,306,324 B2
(45) Date of Patent: Nov. 6, 2012

(54) IMAGE PROCESSING METHOD AND IMAGE PROCESSING APPARATUS

(75) Inventor: Hiroyuki Sanami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/216,399

(22) Filed: Aug. 24, 2011

(65) Prior Publication Data

US 2011/0304637 A1    Dec. 15, 2011

Related U.S. Application Data

(63) Continuation of application No. 11/675,333, filed on Feb. 15, 2007, now Pat. No. 8,027,535.

(30) Foreign Application Priority Data

Feb. 24, 2006 (JP) .................................. 2006-048979

(51) Int. Cl.
*G06K 9/34* (2006.01)

(52) U.S. Cl. ........................................ 382/173; 382/199

(58) Field of Classification Search .................. 382/162, 382/167, 173, 282–283, 199; 358/1.9, 537–540, 358/452–453; 345/418, 585, 620–622, 633–635; 348/347; 715/724–725, 764, 768, 770
See application file for complete search history.

(56) References Cited

U.S. PATENT DOCUMENTS

| | | | |
|---|---|---|---|
| 4,949,279 A * | 8/1990 | Takakura et al. | 345/418 |
| 5,613,046 A * | 3/1997 | Dermer | 358/1.9 |
| 5,680,525 A * | 10/1997 | Sakai et al. | 345/585 |
| 5,949,431 A | 9/1999 | Matsumura et al. | |
| 6,201,548 B1 | 3/2001 | Cariffe et al. | |
| 6,345,117 B2 * | 2/2002 | Klassen | 382/167 |
| 6,839,086 B1 * | 1/2005 | Katagiri | 348/347 |
| 7,340,097 B2 | 3/2008 | Kondo et al. | |
| 7,831,095 B2 | 11/2010 | Sanami | |
| 2004/0227772 A1 | 11/2004 | Huang et al. | |
| 2005/0104898 A1 | 5/2005 | Moffitt et al. | |
| 2005/0275663 A1 | 12/2005 | Kokojima et al. | |
| 2006/0115185 A1 | 6/2006 | Iida et al. | |

FOREIGN PATENT DOCUMENTS

| | | | |
|---|---|---|---|
| JP | 59-133665 A | 8/1984 |
| JP | 04-340671 A | 11/1992 |
| JP | 05-061970 A | 3/1993 |

OTHER PUBLICATIONS

Japanese Office Action issued on Jul. 2, 2012, in counterpart Japanese application No. 2011-162449.

* cited by examiner

*Primary Examiner* — Ishrat I Sherali

(74) *Attorney, Agent, or Firm* — Fitzpatrick, Cella, Harper & Scinto

(57) ABSTRACT

This invention relates to an image processing method and image processing apparatus for improving the image quality of the boundary part of an image cut-out or deletion area. According to this method, an area specified by a user as a cut-out or deletion target area is slightly reduced or enlarged to eliminate an undesirable background area. In image cut-out, the cut-out image side is shaded off. In image deletion, the background image side is shaded off. This increases the image quality at the joint between the boundary part of the cut-out image and an image to be composited. The image quality between the remaining background image and the deletion part also improves.

6 Claims, 13 Drawing Sheets

IMAGE PROCESSING METHOD AND IMAGE PROCESSING APPARATUS

RELATED APPLICATIONS

This is a continuation of application Ser. No. 11/675,333, filed Feb. 15, 2007, claims benefit of that application under 35 U.S.C. §120, and claims benefit under 35 U.S.C. §119 of Japanese Patent Application No. 2006-048979, filed Feb. 24, 2006. The entire contents of each of the two mentioned prior applications are incorporated herein by reference.

BACKGROUND OF THE INVENTION

1. Field of the Invention

The present invention relates to an image processing method and image processing apparatus. Particularly, the present invention relates to an image processing method and image processing apparatus which man-machine-interactively select a partial area of an image displayed on a screen and cut out or process the image in the selected area.

2. Description of the Related Art

In cutting out a part of an image displayed on a screen and compositing it with another image, a known technique is used to shade off the edge of the cut-out area to suppress jaggedness of the image edge. For example, Japanese Patent Publication Laid-Open No. 4-340671 proposes a technique of suppressing jaggedness upon image composition by shading off both sides of the boundary of a mask image (by uniformly allocating the shade-off inside and outside of the image).

The technique of shading off the boundary part of a mask image in cut-out image composition is very effective for suppression of jaggedness.

In the prior art, however, background pixels around the boundary are subjected to shade-off processing upon shading off the edge periphery. This processing may make transparent background pixels translucent. As a result, the processed part is noticeable.

As a psychological aspect of an operator who should specify an image cut-out area man-machine-interactively, she/he tends to set an area including the cut-out target image as much as possible. As a result, the cut-out boundary part often contains the background image. If the periphery of the boundary part shades off in this state, the background image area extends, resulting in a poor image quality in the boundary area.

If an area is partially deleted from an image with shading off near the edge, the contrast of the edge part is degraded. The edge of the deletion target area that must be transparent becomes translucent. Hence, it is impossible to completely delete the desired part.

Additionally, the operator feels stress in editing and finely adjusting the boundary part of an image cut-out area by, e.g., man-machine-interactively editing the outline point of each pixel or painting the mask edge.

SUMMARY OF THE INVENTION

Accordingly, the present invention is conceived as a response to the above-described disadvantages of the conventional art.

For example, an image processing method and an apparatus using the method according to this invention are capable of improving the image quality in image cut-out composition processing by selectively defining the way of shading off a mask image.

According to one aspect of the present invention, preferably, there is provided an image processing method of cutting out or deleting a target desired by a user from an image displayed in a display window, comprising: a displaying step of displaying, in the display window, an image to be cut out or deleted; a specifying step of specifying a boundary of an area of the cut-out or deletion target from the image displayed in the displaying step; an altering step of altering the boundary to reduce or enlarge, by a small amount, a closed area defined by the boundary specified in the specifying step; and an editing step of editing to cut out or delete an image in the closed area defined by the boundary altered in the altering step.

According to another aspect of the present invention, preferably, there is provided a computer program which executes each step recited in the above method in a computer.

According to still another aspect of the present invention, preferably, there is provided an image processing apparatus which executes the above computer program, comprising: a display which displays an image; a storage device in which the computer program is installed; a CPU which executes the computer program; instruction means for causing a user to input an instruction to the image processing apparatus; and input means for inputting image data representing the image.

The invention is particularly advantageous since it enables high-quality image cut-out and image deletion by excluding any undesirable image other than the selection target.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
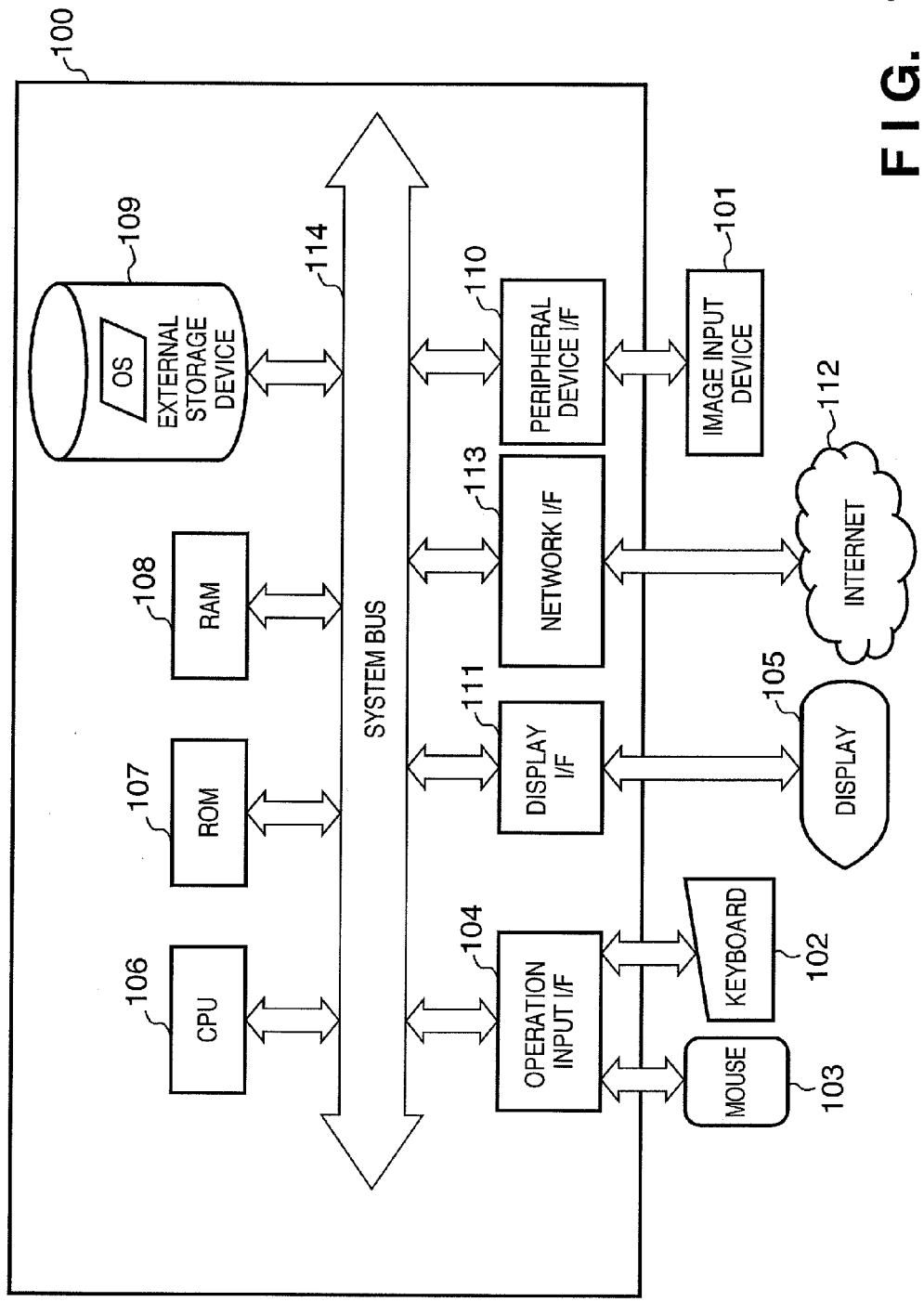
FIG. 1 is a block diagram showing the arrangement of a personal computer that performs an image processing method according to a typical embodiment of the present invention.

FIG. 1 is a block diagram showing the arrangement of a personal computer (PC) that performs image cut-out processing according to a typical embodiment of the present invention.

Any information processing apparatus other than the PC shown in FIG. 1 can perform the image cut-out processing according to this embodiment if it fundamentally has the same arrangement as the PC. In addition to a stand-alone PC, a plurality of computers connected via a network to distribute functions or a portable computer is usable.

As shown in FIG. 1, a PC 100 is connected to an image input device 101 that reads an image as digital data, and a keyboard 102 and mouse 103 provided to man-machine-interactively perform image cut-out processing. A user can input an instruction of, e.g., image processing or window manipulation to the PC 100 by using the keyboard 102 and mouse 103. The PC 100 is also connected to a display 105 such as an LCD that displays various kinds of information and images. The display 105 may be of an integrated type that is incorporated in the main body of the PC 100.

The image input device 101 includes at least one of a DVD drive, CD drive, scanner, digital camera, PC card, flexible disk, magneto-optical (MO) disk drive, ZIP drive®, and file system. The image input device 101 is connected to the PC 100 via a peripheral device interface (I/F) 110.

Not only the image input device but also a printer (not shown) can also be connected to the peripheral device interface (I/F). The printer receives image data and prints an image. In this embodiment, a USB is employed as the peripheral device interface. However, an interface conforming to another specification is also usable.

The PC 100 includes a CPU 106 that controls the overall functions, a ROM 107 that stores programs and parameters requiring no change, a RAM 108 that temporarily stores programs and data supplied from an external device, and an external storage device 109. The external storage device 109 may be a fixed medium such as a hard disk or a nonvolatile memory card with a mass storage volume. The external storage device 109 may also be a removable medium such as a flexible disk (FD) or a compact disk (CD). Other examples of the removable medium may be a magnetic card, optical card, IC card, and memory card.

The PC 100 comprises an operation input interface (I/F) 104 to connect the keyboard 102 and mouse 103, and a display I/F 111 to connect the display 105. The PC 100 also comprises a network I/F 113 to connect to Internet 112. The PC 100 can also be connected to a LAN or another network via the network I/F 113.

These constituent elements are connected to each other via a system bus 114.

The RAM 108 temporarily saves image data, image information, and calculation results during the operation.

Not only an operating system (OS) to operate the PC 100 but also a printer driver to operate a printer and an application program (to be referred to as an application hereinafter) to execute image cut-out processing to be described below are installed in the external storage device 109.

Some embodiments of image processing executed by the PC with the above-described arrangement will be described next. This image processing is executed when the user activates the application.

FIRST EMBODIMENT

Figure 2:
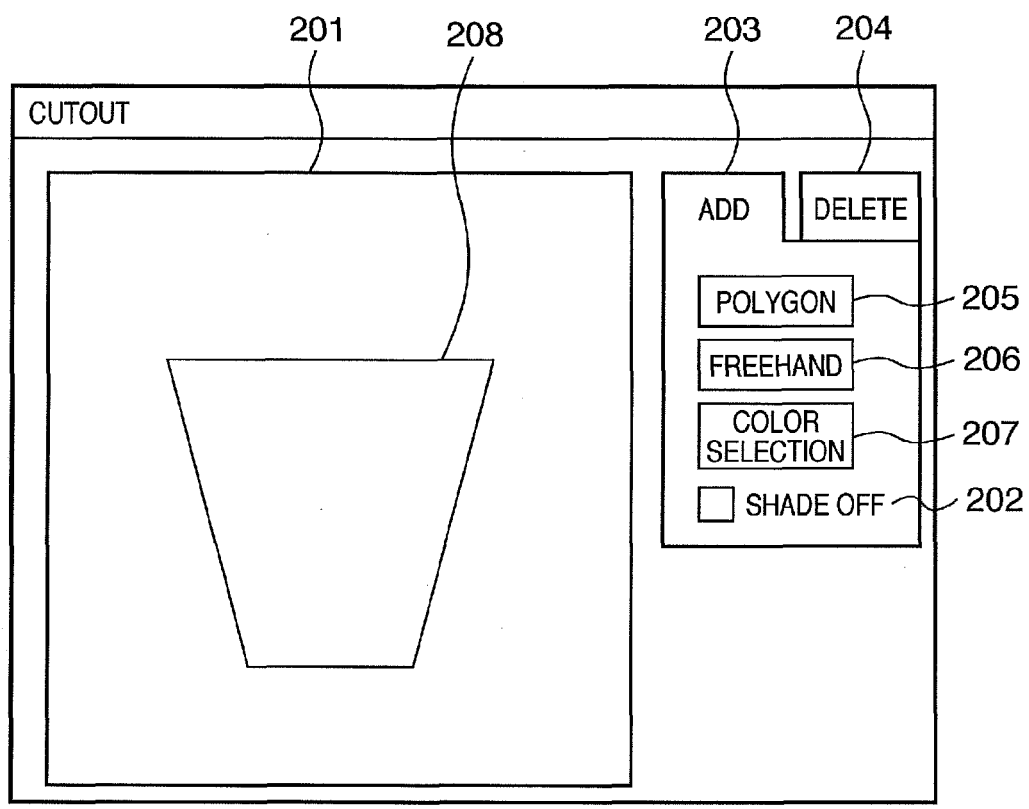
FIG. 2 is a view showing an example of the display window of an application executed by the personal computer shown in FIG. 1.

FIG. 2 is a view showing an example of a window displayed on a display screen by an application that executes image processing according to the first embodiment. As shown in FIG. 2, when the user initiates to execute the application, an image 208 to be cut out is displayed in a display window 201.

Referring to FIG. 2, reference numeral 202 denotes a check box to instruct the PC to shade off the boundary of the image; 203, an "add" tab; and 204, a "delete" tab. Addition processing and deletion processing indicated by these tabs are exclusively performed each other so that one of them is always active. Tool buttons 205 to 207 are used to select a way of setting a cut-out or deletion area. The three buttons have an exclusive relationship between them so that one of them is always displayed in the selection window with a gray background.

Although not illustrated, when the "delete" tab 204 is active, the check box 202 and tool buttons 205 to 207 are displayed in the operation window of this tab so that the user can perform the same operation as in addition processing.

The user adds an image cut-out area by making the "add" tab active and setting a cut-out area. On the other hand, the user deletes an image cut-out area by making the "delete" tab active and setting a deletion area. In the deletion mode, the selected area is displayed transparent.

Upon activating the application, the "add" tab is active, as shown in FIG. 2.

The tool button 205 is an instruction button (polygon button) to add a polygonal graphic pattern. After clicking on this button, the user sets outline points by clicking in the window. The user finally double-clicks to fill in the area defined by the outline points.

The tool button 206 is a button (freehand) to add a cut-out area freehand. After clicking on this button, the user drags the cursor displayed in the window to select an area.

The tool button 207 is a color selection button. After clicking on this button, the user clicks in the window to fill in a color area similar to the clicked point.

Figure 3:
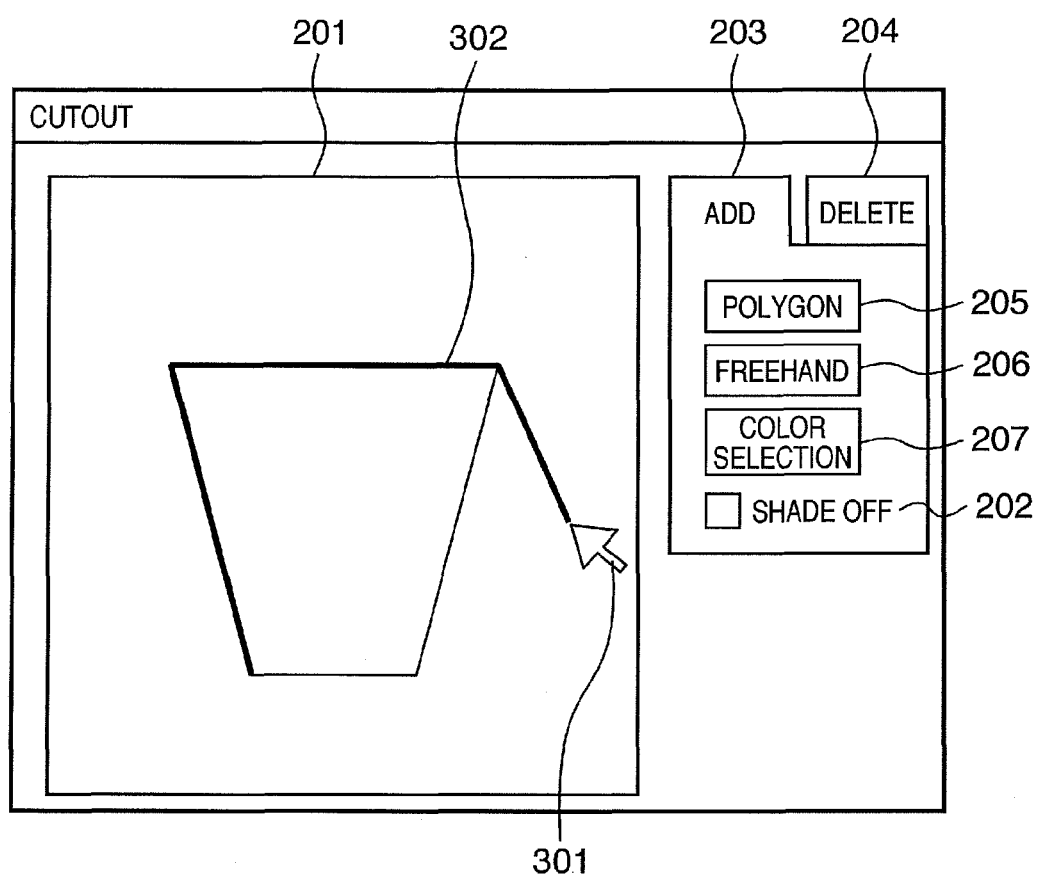
FIG. 3 is a view showing a state wherein a user repeatedly clicks on outline points of a displayed image.

FIG. 3 is a view showing a state wherein the user repeatedly clicks on outline points of a displayed image. The same reference numerals as already described in FIG. 2 denote the same constituent elements in FIG. 3, and a description thereof will be omitted.

Referring to FIG. 3, reference numeral 301 denotes a cursor; and 302, a selected path. FIG. 3 shows a state wherein the user is setting the path 302 along the edge of the image 208. At the end of operation, the user double-clicks the mouse 103 that drags the cursor 301, thereby determining the cut-out area or deletion area.

Figure 4:
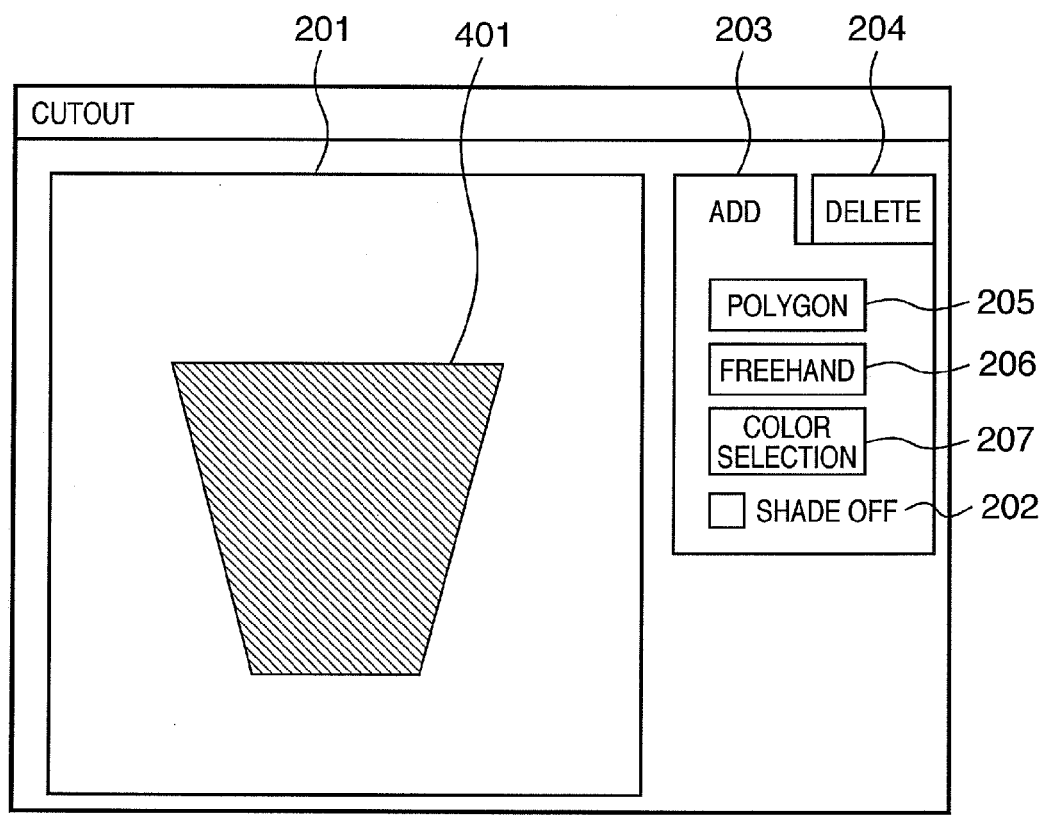
FIG. 4 is a view showing a display window after cut-out area determination.

FIG. 4 is a view showing a display window after cut-out area determination.

As shown in FIG. 4, when the cut-out area is determined, a selected area 401 is filled in with black. Note that the filled area 401 is shown as a shaded area in FIG. 4.

If the application is ended in this state, the selected area 401 is set as a mask image. The RAM 108 holds the mask image as the transparency information of the original image.

If the user turns on the check box 202 and generates a mask image by setting outline points, shade-off processing is executed.

Figure 5:
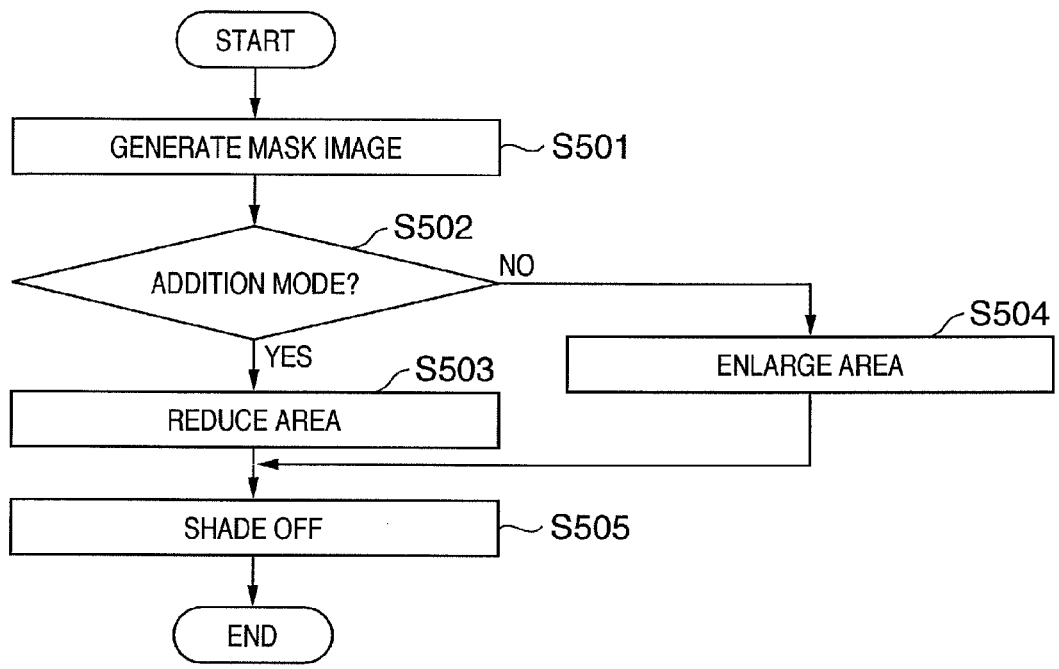
FIG. 5 is a flowchart showing shade-off processing according to the first embodiment.

FIG. 5 is a flowchart showing shade-off processing according to the first embodiment.

In step S501, a mask image without shading is generated. This is performed by causing the user to execute the above-described operation shown in FIGS. 2 to 4.

In step S502, it is checked whether or not the current mode is the addition mode. If the current mode is the addition mode (the "add" tab 203 is selected in the display windows shown in FIGS. 2 to 4), the process advances to step S503 to reduce the mask image area by two pixels, thereby reducing the mask area. If the current mode is not the addition mode, i.e., if it is the deletion mode (the "delete" tab 204 is selected in the display windows shown in FIGS. 2 to 4), the process advances to step S504 to enlarge the area by two pixels, thereby extending the mask area.

When the process in step S503 or S504 is completed, the process advances to step S505 to shade off the boundary part of the mask image by using the reduced or enlarged area.

Figure 6A:
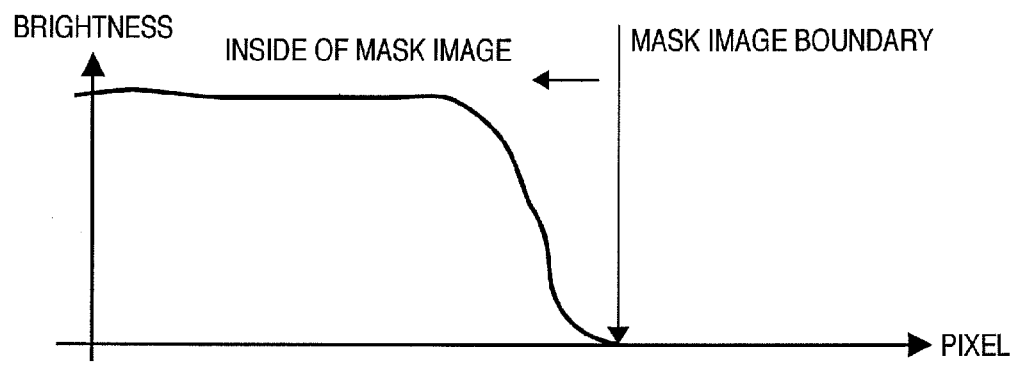
FIGS. 6A and 6B are graphs showing changes in the brightness value of the edge (boundary) part of a mask image obtained by shade-off processing.
Figure 6B:
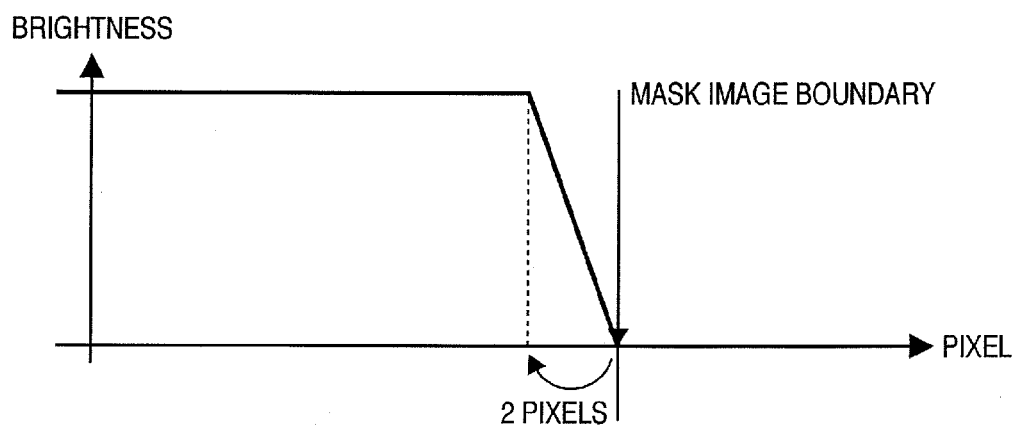

FIGS. 6A and 6B are graphs showing changes in the brightness value of the edge (boundary) part of a mask image obtained by shade-off processing. FIGS. 6A and 6B show examples of changes in the brightness value when the mask image area is reduced by two pixels.

FIG. 6A shows a change in the brightness of an original image. FIG. 6B shows a change in the brightness of a mask image that is shaded off inward by two pixels. This shade-off processing eliminates an abrupt change in the brightness of the edge part (outline part) of the mask image.

In this embodiment, if a cut-out area is to be added by image cut-out processing, the mask image is shaded off inward in the selected area 401. If a cut-out area is to be deleted by image cut-out processing, the mask image is shaded off outward from the selected area 401. The shade-off processing is performed when the check box 202 is clicked on.

In both modes, average shading is performed by calculating the sum of neighboring pixel values and dividing it by the number of pixels. Alternatively, the shade-off processing may be performed such that the change in the pixel values exhibits a Gaussian distribution.

The mask image with the shaded edge part is cut out or deleted from the original image.

According to the above-described embodiment, an image that is shaded off inward in a selected image with a slightly smaller area is cut out from the original image. Hence, even if the user tends to cut out an area including the background image part, an area slightly smaller than the selected area is cut out actually. This excludes any undesirable background image from the cut-out area.

Since shade-off processing is performed in the inward direction of a mask image with a slightly smaller area, the background image is excluded from the shade-off processing. When a thus cut-out image is composited with another image, no undesirable background image is displayed. Hence, a high-quality composite image is displayed.

On the other hand, in deleting a selected image, an image that is shaded off outward from the selected image with a slightly larger area is deleted from the original image. Hence, even if the user tends to select an area including the background image part, an area slightly larger than the selected area is deleted actually.

Since shade-off processing is executed in the outward direction of a mask image with a slightly larger area, the deletion image does not include the shade-off processing. The area selected as the deletion area certainly becomes transparent. Hence, the background image is prevented from remaining in the boundary part of the deletion area.

SECOND EMBODIMENT

An example will be described in which the shade-off method can be selected from a plurality of methods.

Figure 7:
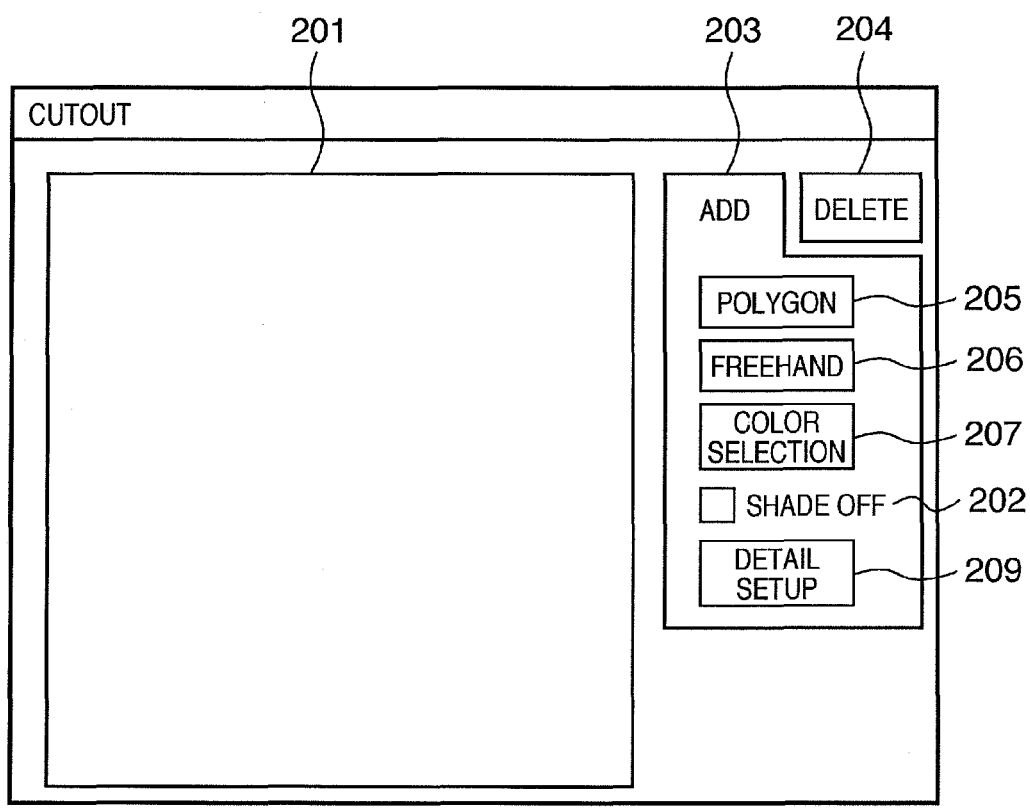
FIG. 7 is a view showing an example of a window displayed on a display screen by an application that executes image processing according to the second embodiment.

FIG. 7 is a view showing an example of a window displayed on a display screen by an application that executes image processing according to the second embodiment. The same reference numerals as already described in the first embodiment denote the same constituent elements in FIG. 7, and a description thereof will be omitted.

Referring to FIG. 7, reference numeral 209 denotes a detail setup button capable of setting details of the shade-off method.

Figure 8:
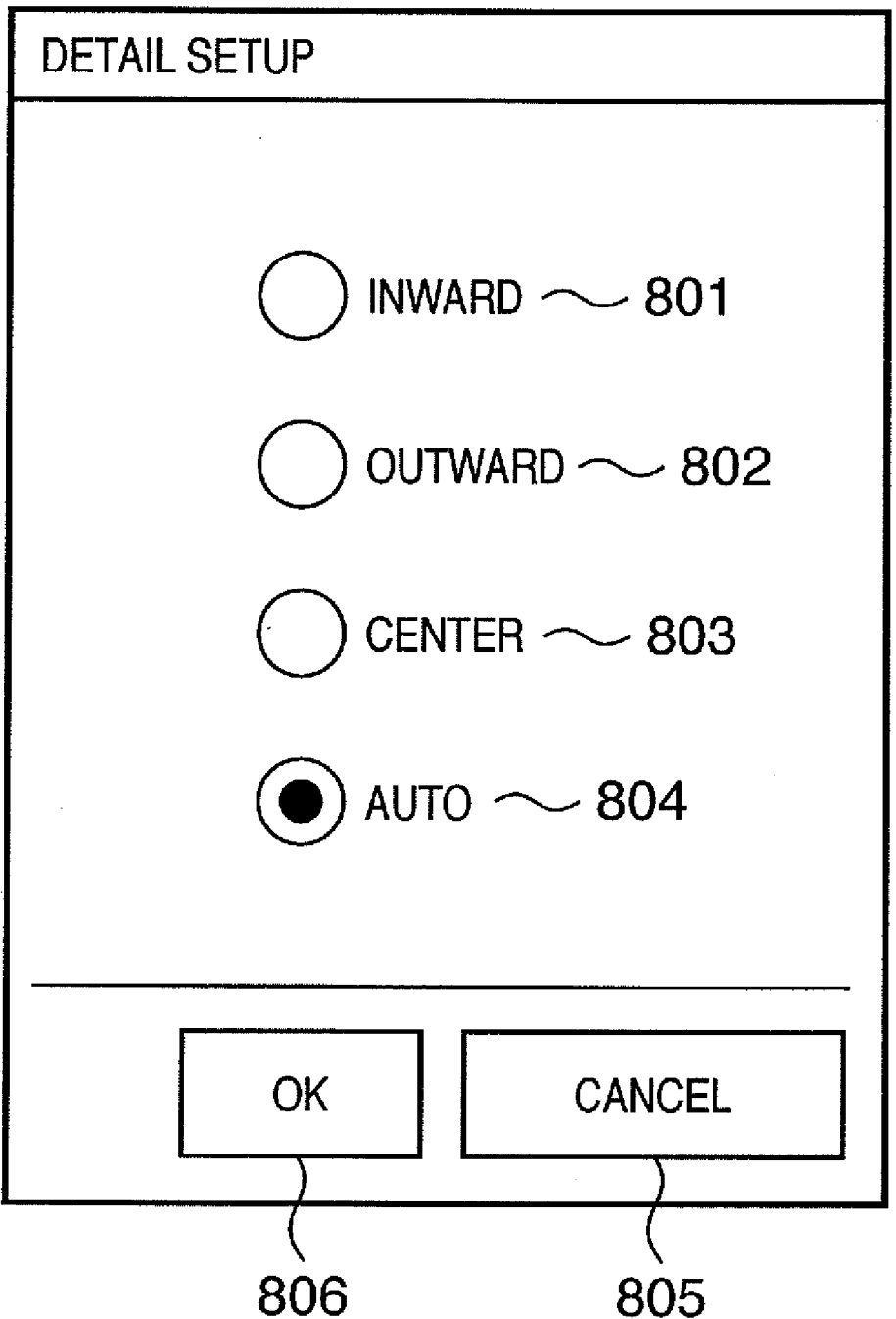
FIG. 8 is a view showing a detail setup dialogue display window that is displayed by clicking on a detail setup button.

FIG. 8 is a view showing a detail setup dialogue display window that is displayed by clicking on the detail setup button.

Referring to FIG. 8, reference numerals 801 to 804 denote shade-off method selection buttons. These buttons are exclusively selectable. The "auto" shade-off button 804 is selected by default. Auto shade off is the same as the shade-off processing of the first embodiment. An OK button 806 determines selection. A cancel button 805 discards a change in the dialogue.

When the inward shade-off button 801 is selected, shade-off processing is always performed inward in a selected image. When the outward shade-off button 802 is selected, shade-off processing is always performed outward. When the center shade-off button 803 is selected, shade-off processing is performed as conventionally by uniformly allocating the shade off inside and outside of the image.

Figure 9A:
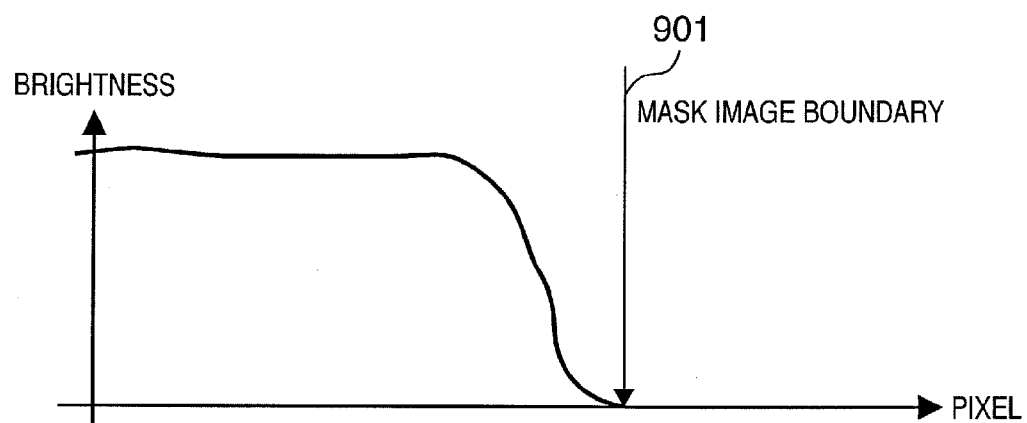
FIGS. 9A and 9B are graphs showing changes in the brightness value of the edge (boundary) part of a mask image obtained by shade-off processing according to the second embodiment.
Figure 9B:
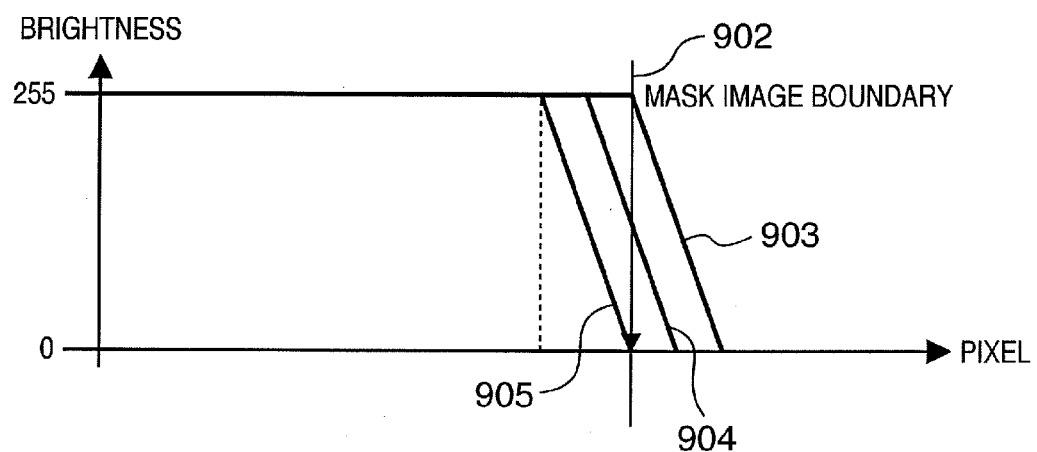

FIGS. 9A and 9B are graphs showing changes in the brightness value of the edge (boundary) part of a mask image obtained by shade-off processing according to the second embodiment.

FIG. 9A shows a change in the brightness of the boundary part of an original image. FIG. 9B shows a change in the brightness of the boundary part of a mask image. Referring to FIGS. 9A and 9B, each of arrows 901 and 902 indicates a boundary designated by the user as a mask image. The left side of each arrow indicates an image to be cut out or deleted. The right side indicates the background image. In these images, the brightness component of each pixel is expressed by 8 bits. A pixel having brightness "255" is translucent. A pixel having brightness "0" is transparent.

When the inward shade-off button 801 is selected in FIG. 8, the brightness of the boundary part changes as indicated by a curve 905. When the outward shade-off button 802 is selected, the brightness of the boundary part changes as indicated by a curve 903. When the center shade-off button 803 is selected, the brightness of the boundary part changes as indicated by a curve 904.

Figure 10:
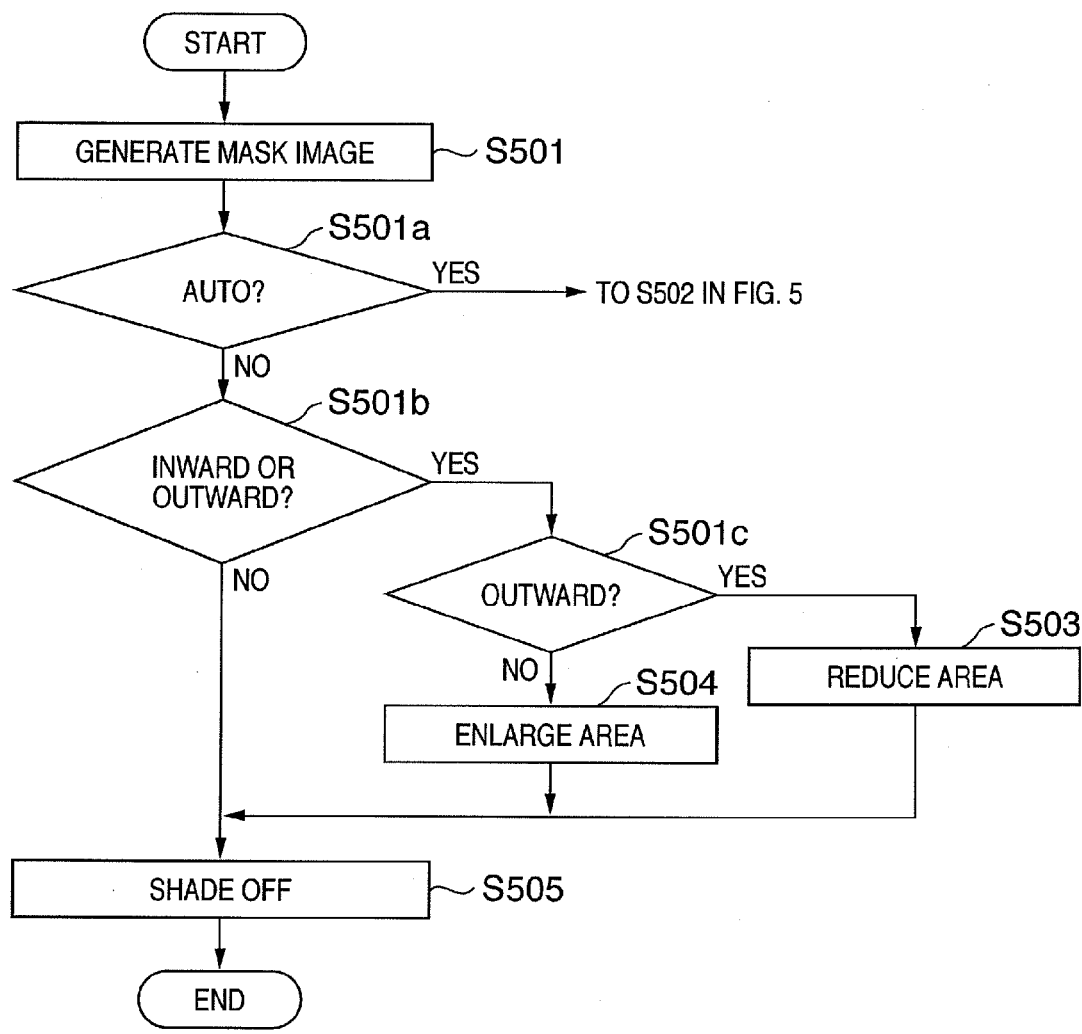
FIG. 10 is a flowchart showing shade-off processing according to the second embodiment.

FIG. 10 is a flowchart showing shade-off processing according to the second embodiment. The same step numbers as already described in the flowchart of the first embodiment denote the same processing steps in FIG. 10, and a description thereof will be omitted.

After a mask image is generated in step S501, it is checked in step S501a whether or not the auto shade-off button 804 is selected. If it is determined that the auto shade-off button 804 is selected, the process advances to step S502 in FIG. 5 to execute the same processing as in the first embodiment. If it is determined that a button other than the auto shade-off button 804 is selected, the process advances to step S501b.

In step S501b, it is checked whether the inward shade-off button 801 or outward shade-off button 802 is selected. If it is determined that the inward shade-off button or outward shade-off button is selected, the process advances to step S501c. If it is determined that a bottom other than the inward shade-off button or outward shade-off button, i.e., the center shade-off button 803 is selected, the process advances to step S505 to execute the shade-off processing described in the first embodiment. Then, the processing is ended.

In step S501c, it is checked which one of the inward shade-off button 801 and outward shade-off button 802 is selected. If the outward shade-off button is selected, the process advances to step S504. If the inward shade-off button is selected, the process advances to step S503. Then, the processing described in the first embodiment is executed.

As described above, according to this embodiment, the user can execute shade-off processing on her/his desired boundary part.

THIRD EMBODIMENT

An example will be described in which a mask image is treated not as transparency information but as a selected area for various kinds of image correction.

Figure 11:
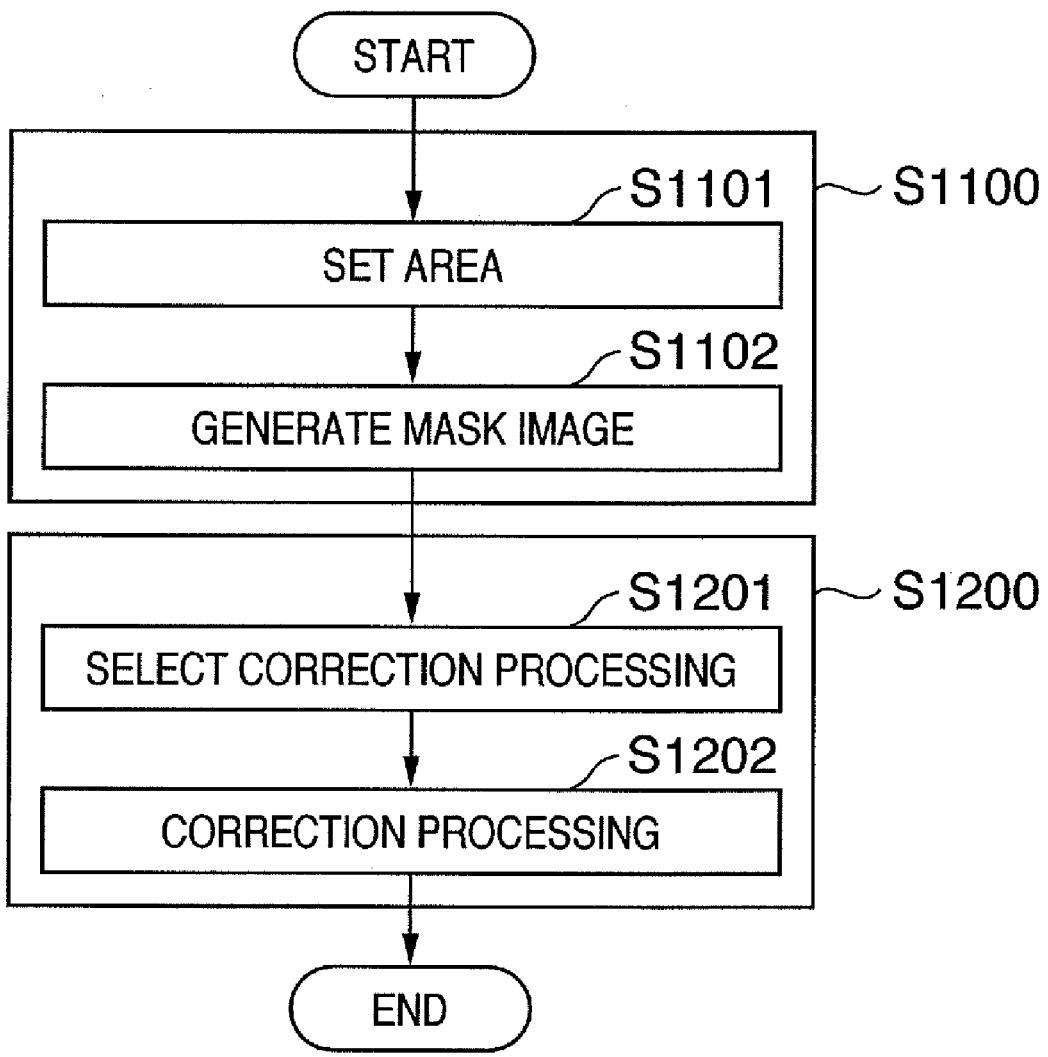
FIG. 11 is a flowchart showing shade-off processing according to the third embodiment.

FIG. 11 is a flowchart showing shade-off processing according to the third embodiment. The processing according to the third embodiment includes two steps, process area setting 1100 and correction parameter setting 1200.

In the first process area setting, the user sets a process area in step S1101.

Figure 12:
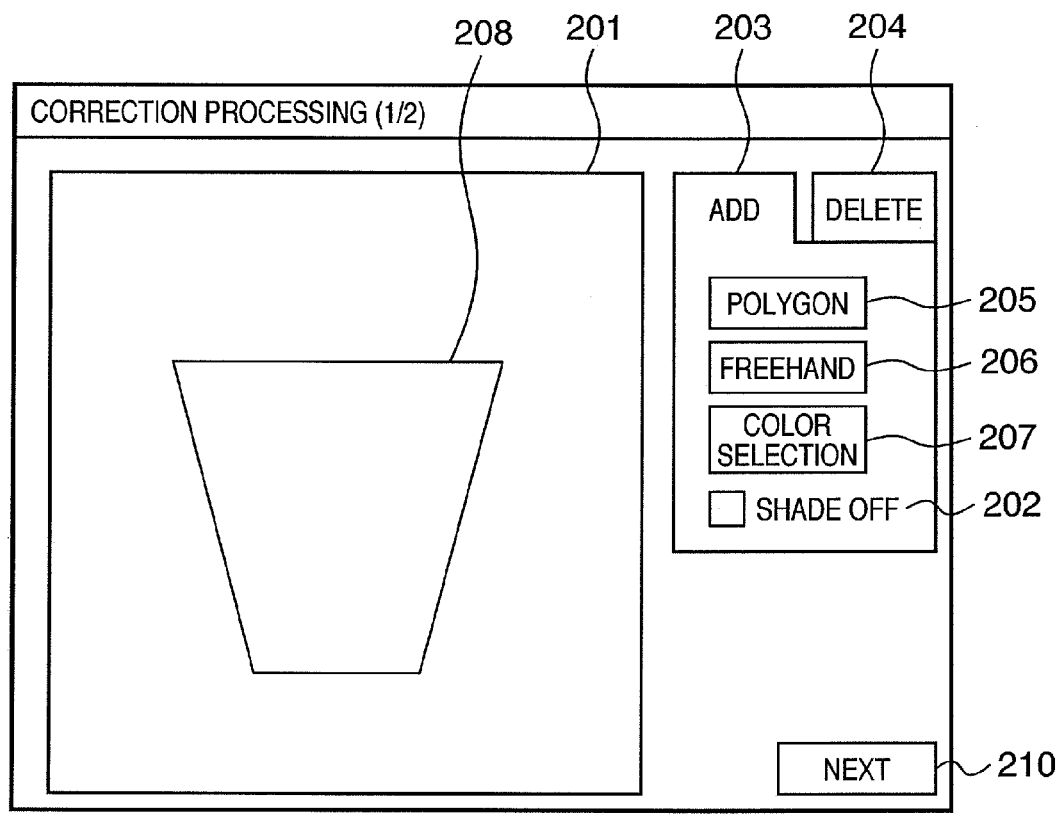
FIG. 12 is a view showing a display window to cut out or delete an image.

FIG. 12 is a view showing a display window to cut out or delete an image. The user designates, on the PC, a process area for image cut-out or deletion by using the display window, as described in the first embodiment. The user clicks on a "next" button 210. The process advances to step S1102 to generate a mask image.

This generation processing is the same as in the first and second embodiments.

The process advances to the correction parameter setting processing 1200. In step S1201, the user selects correction processing.

Figure 13:
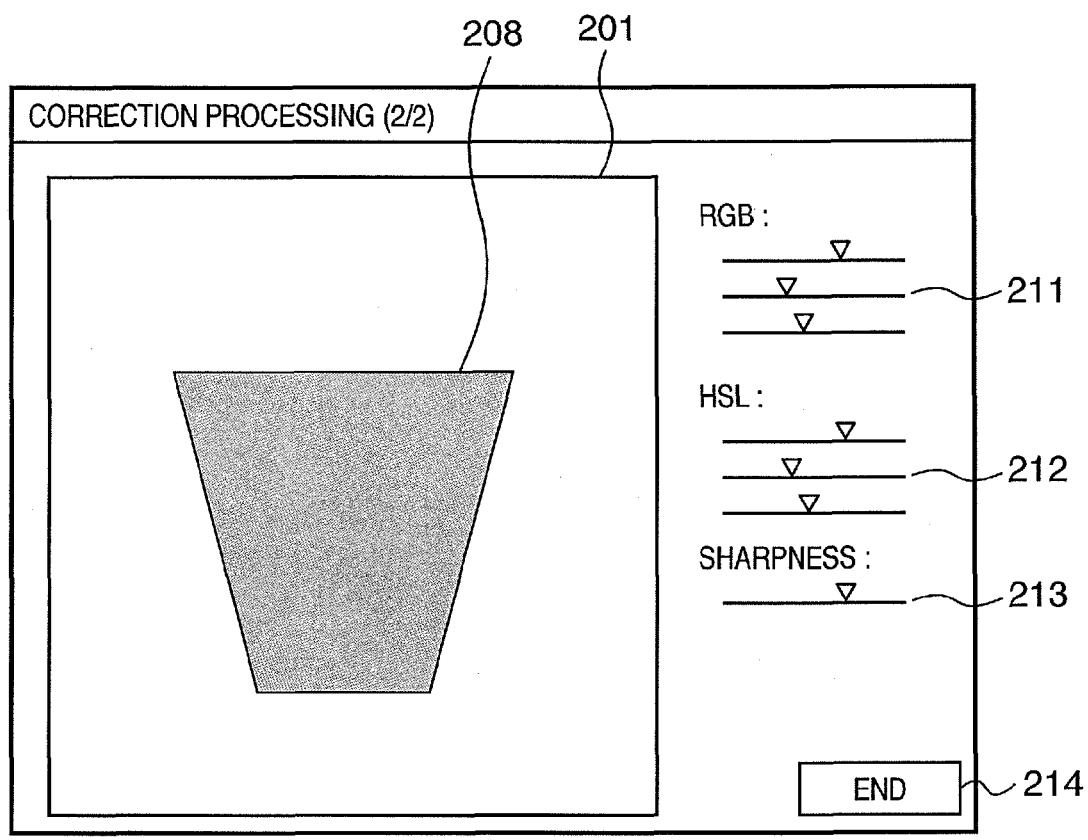
FIG. 13 is a view showing a display window to set correction parameters.

FIG. 13 is a view showing a display window to set correction parameters.

In this display window, the user adjusts RGB colors by using a slide bar 211, adjusts HSL colors by using a slide bar 212, and sets parameters such as sharpness by using a slide bar 213. These settings are applicable only to the generated mask image area. The user clicks on an "end" button 214. The process advances to step S1202 to display the result in a display area 201.

According to the above-described embodiment, the user can cut out or delete an image while confirming the result of adjustment performed by himself/herself.

The object of the present invention is achieved by supplying a storage medium which stores program codes to implement the functions of the above-described embodiments to a system or apparatus and causing the computer of the system or apparatus to read out and execute the program codes in the storage medium.

In this case, the program codes read out from the storage medium implement the functions of the above-described embodiments by themselves, and the storage medium which stores the program codes constitutes the present invention.

The functions of the above-described embodiments are implemented even when the OS running on the computer partially or wholly executes actual processing on the basis of the instructions of the program codes.

The program codes read out from the storage medium also implement the functions of the above-described embodiments by the following steps.

(1) The program is written into the memory of a function expansion card inserted into the computer or a function expansion unit connected to the computer.

(2) The CPU of the function expansion card or function expansion unit partially or wholly executes actual processing on the basis of the instructions of the written program codes.

The program can take any form such as an object code, a program to be executed by an interpreter, or script data to be supplied to the OS as long as the computer can implement the functions of the above-described embodiments.

Examples of the storage medium to supply the program are a RAM, NV-RAM, a floppy® disk, optical disk, magnetooptical disk, CD-ROM, MO, CD-R, and CD-RW. The storage medium can also be a DVD (DVD-ROM, DVD-RAM, DVD-RW, and DVD+RW), magnetic tape, nonvolatile memory card, or a ROM of another type if it can store the program. The program may be downloaded from another computer (not shown) or database connected to the Internet, commercial network, or local area network.

INDUSTRIAL APPLICABILITY

The present invention is applicable to all kinds of processes to select and process a part of an image. In selecting a target area and cutting out or processing only the selected area, the unnaturalness of the boundary part is relaxed, and the quality of the image as the processing result is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a specifying unit configured to specify a subject image including a plurality of pixels based on a user's manual designation; and
   a processing unit configured to automatically adjust a boundary of the subject image specified by said specifying unit in an inward direction and effect a shade-off processing on pixels near the adjusted boundary of the subject image.

2. The apparatus according to claim 1, further comprising a cut-out unit configured to cut out the subject image on which the shade-off processing has been effected by said processing unit.

3. The apparatus according to claim 1, wherein said specifying unit specifies the subject image as a closed area.

4. The apparatus according to claim 1, wherein said processing unit adjusts the boundary of the subject image by reducing an area designated by the user's manual designation.

5. An image processing method comprising:
   specifying a subject image including a plurality of pixels based on a user's manual designation; and
   automatically adjusting a boundary of the specified subject image in an inward direction and effecting a shade-off processing on pixels near the adjusted boundary of the specified subject image.

6. A non-transitory computer-readable storage medium which stores a computer-executable program for causing a computer to perform an image processing method, the method comprising:
   specifying a subject image including a plurality of pixels based on a user's manual designation; and
   automatically adjusting a boundary of the specified subject image in an inward direction and effecting a shade-off processing on pixels near the adjusted boundary of the specified subject image.

* * * * *